United States Patent [19]

Nowell

[11] Patent Number: 4,646,371

[45] Date of Patent: Mar. 3, 1987

[54] BED FRAME

[75] Inventor: Richard A. Nowell, Carlsbad, Calif.

[73] Assignee: Harris-Hub Company, Inc., Harvey, Ill.

[21] Appl. No.: 825,548

[22] Filed: Feb. 3, 1986

[51] Int. Cl.⁴ ............................................. A47C 19/00
[52] U.S. Cl. .................................... 5/200 R; 5/200 C; 5/201; 5/285; 403/361
[58] Field of Search .................... 5/200 R, 200 C, 201, 5/282 R, 285, 286, 289, 293, 294; 403/321, 329, 330, 356, 358, 359

[56] References Cited

U.S. PATENT DOCUMENTS

| | | | |
|---|---|---|---|
| 620,591 | 3/1899 | Jackson | 5/200 R |
| 1,669,625 | 5/1928 | Oppenheim | 5/200 C |
| 3,188,664 | 6/1965 | Goldberg | 5/282 R |
| 3,710,405 | 1/1973 | Watts | 5/201 |
| 4,224,786 | 9/1980 | Langlie | 403/361 |
| 4,361,930 | 12/1982 | Seesengood | 403/361 |

Primary Examiner—William F. Pate, III
Assistant Examiner—Dan W. Pedersen
Attorney, Agent, or Firm—Dressler, Goldsmith, Shore, Sutker & Milnamow, Ltd.

[57] ABSTRACT

A knockdown type of bed frame constructed predominantly from plastic components. The bed frame includes a pair of parallel side-tube members and a pair of cross-tube members. The end positions of the side-tube members and the cross-tube members are received in corresponding sockets formed in floor engaging leg members. Means are provided for retaining the side-tube members and the cross-tube members within the sockets formed in the leg members. The leg members are formed with substantially horizontal surfaces for receipt of mattress means thereon.

The leg members are provided with floor engaging means. In accordance with one embodiment of the invention the floor engaging means is a caster wheel assembly incorporating a brake mechanism for applying a braking action to a caster wheel upon application of a predetermined downward force thereto. In accordance with another embodiment of the invention the floor engaging means is a glide assembly which incorporates means to facilitate initial movement thereof over a carpeted floor.

32 Claims, 17 Drawing Figures

BED FRAME

TECHNICAL FIELD OF INVENTION

This invention relates to bed frames for supporting a mattress means in spaced relation to a floor and, more particularly, to bed frames of the knockdown type which are constructed predominantly from plastic components. The invention further relates to improved caster assemblies and glide assemblies for use in combination with such bed frames.

BACKGROUND OF THE INVENTION

Bed frames of the knockdown type for supporting a box spring and/or mattress above a floor have conventionally included a pair of spaced generally L-shaped steel side frame members and a pair of spaced generally L-shaped steel cross frame members extending perpendicular, therebetween, with the cross frame members commonly consisting of separate elements detachably secured to one another. The side and cross frame members cooperate to provide a base for supporting a mattress and/or box spring above the floor. The bed frame is typically supported by metal legs, positioned adjacent the intersection between the side and cross frame members, having floor engaging caster or glide assemblies associated therewith. Exemplary of such prior art bed frames are disclosed in U.S. Pat. Nos. 3,537,114, 3,555,579, 3,646,623, 3,683,429, 3,757,361, 3,795,022, 3,803,644, 4,224,704 and 4,276,665, which patents are assigned to the assignee of the present invention.

The prior art bed frame constructions of the type described above, have served to adequately support a mattress and box-spring unit quite well and have met with a very considerable degree of commercial success in so doing. However, such bed frame constructions, being made essentially from relatively expensive steel components, are quite heavy and therefore expensive to ship and difficult to handle. Further, such bed frame constructions require factory assembly of various component parts and must be painted to avoid rust and improve appearance.

Accordingly, there is a need in the art for an inexpensive bed frame construction that is strong, yet light in weight, and that requires little or no factory assembly of component parts and eliminates screws, nuts etc. It is also desirable that the bed frame construction be easy to assemble by the consumer without the necessity of any special tools.

Bed frames are typically supported on caster assemblies or glide assemblies which extend downwardly from the legs into contact with the floor. In normal use it is desirable that a bed frame remain in a stationary position, particularly when a person is resting on the mattress supported thereon. However, it is periodically necessary to move the bed frame and the unoccupied mattress supported thereon. Further, the caster assemblies and glide assemblies may rest on a carpeted floor. Accordingly, there is a need in the art for a bed frame having support assemblies that permit the bed frame, and the mattress assembly supported thereon, to be easily moved over the floor when unoccupied and which assure that the bed frame remains in a stationary position when occupied. Such caster assemblies and guide assemblies should also be structurally strong and inexpensive to manufacture.

SUMMARY OF THE INVENTION

The foregoing disadvantages of the prior art are overcome in accordance with the present invention by providing a bed frame construction made predominantly from plastic components. The bed frame includes a pair of longitudinally extending, spaced, parallel side-tube members having first and second end portions and formed of a plastic material; and a pair of transversely extending, spaced, parallel cross-tube members having first and second end portions and also formed of a plastic material. A plurality of leg members, formed of a plastic material, receive and support the side tube members and the cross-tube members above a floor. The leg members have a longitudinal socket integrally formed therein for receiving one of the first or second end portions of one of the side-tube members, and a transverse socket integrally formed therein for receiving one of the first or second end portions of one of the cross-tube members. Floor engaging means such as a caster assembly or glide assembly, extend from the leg members in contact with the floor.

The leg members are formed with substantially horizontal surfaces for receipt of a mattress and/or box spring thereon. To retain the side-tube members within the longitudinal sockets, the leg members preferably have an opening formed in the horizontal surface thereof in communication with an upper portion of the longitudinal socket. A living hinge member formed integrally with the horizontal surface extends into the opening, so as to frictionally engage the side-tube member upon application thereto of a downward force from the mattress and/or box spring supported thereon. To retain the cross-tube members within the transverse sockets, the end portions of the cross-tube members are preferably provided with longitudinally extending rib portions projecting outwardly therefrom, which are received in cooperating key portions formed in the transverse socket. The rib portions have a notch formed therein which extends into the transverse socket, and a latch member is provided, pivotal with respect to the transverse socket, to selectively engage and disengage the notch. Alternatively, the cross-tube members may be provided with an opening formed therein to selectively engage and disengage a latch member.

In accordance with one alternative embodiment of the invention, the first and second end portions of the side-tube members and the cross-tube members have a rectangular cross-section, and the longitudinal and transverse sockets have a cooperating rectangular cross section. The first and second end portions of the cross tube members have openings formed therein for selective receipt of a latch member associated with the leg members in locking engagement therewith.

In accordance with another alternative embodiment of the invention, the bed frame includes generally L-shaped side-rail members, which are received in longitudinal recesses integrally formed in the horizontal surface of the leg members. The side-rail members are held in place upon application of a downward force applied by the mattress and/or box spring on the horizontal surface.

In accordance with a further alternative embodiment of the invention, the floor engaging means for supporting the leg members above the floor includes a caster wheel assembly incorporating a brake mechanism for applying a braking action to a caster wheel upon application of a predetermined downward force thereto. The caster wheel assembly includes a frame member rotatably mounted about a substantially vertical shaft which receives a caster wheel rotatably mounted therein. A brake yoke member is rotatably received about the vertical shaft so as to permit limited vertical movement thereof relative to the caster wheel between an upper position and a lower position. The brake yoke member is formed with a brake surface which is spaced a short distance from the caster wheel when the brake yoke member is in its upper position and in contact with the caster wheel, so as to preclude rotation thereof when the brake yoke member is in its lower position. A biasing means is received about the shaft for biasing the brake yoke member toward its upper position such that upon application of a predetermined downward force to the shaft, the brake yoke member moves from its upper position into its lower position wherein the brake surface contacts the caster wheel and thereby precludes rotation thereof. In accordance with a preferred embodiment of the caster wheel assembly, a pair of caster wheels are provided within the frame member and the brake yoke member is provided with a brake surface to cooperate with each of the caster wheels.

In accordance with an even further embodiment of the invention, the floor engaging means for supporting the leg members above the floor includes a glide assembly which incorporates means to facilitate initial movement thereof over a carpeted floor.

DESCRIPTION OF PREFERRED EMBODIMENT

While the present invention is susceptible of embodiment in many different forms, there are shown in the drawings, and herein will be described in detail, preferred embodiments of the invention, with the understanding that the present disclosure is to be considered as an exemplification of the principles of the invention and is not intended to limit the invention to the embodiments illustrated.

Figures 1, 2:
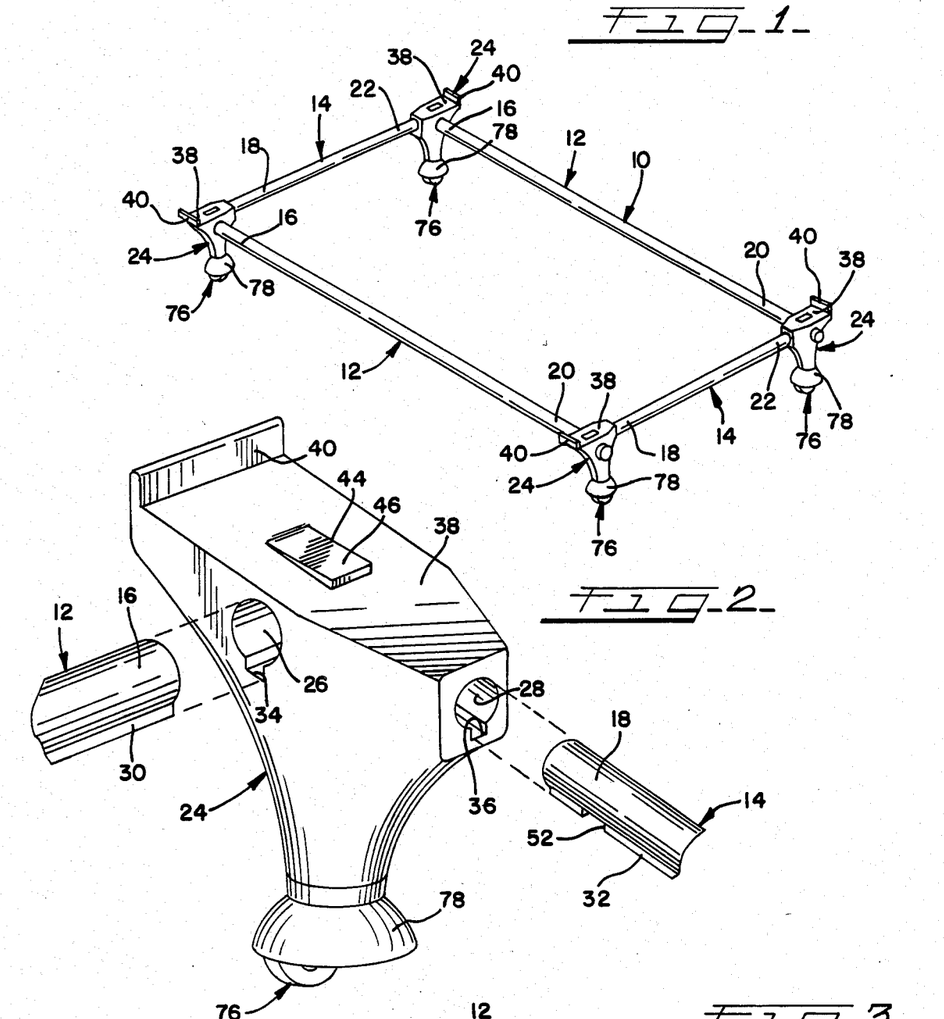
FIG. 1 is a perspective view of a bed frame assembly constructed in accordance with a preferred embodiment of the invention.
FIG. 2 is an enlarged, fragmentary perspective view of a leg member formed in accordance with a preferred embodiment of the invention shown prior to assembly with end portions of a side-tube member and a cross-tube member formed in accordance with a preferred embodiment of the invention.
Figure 3:
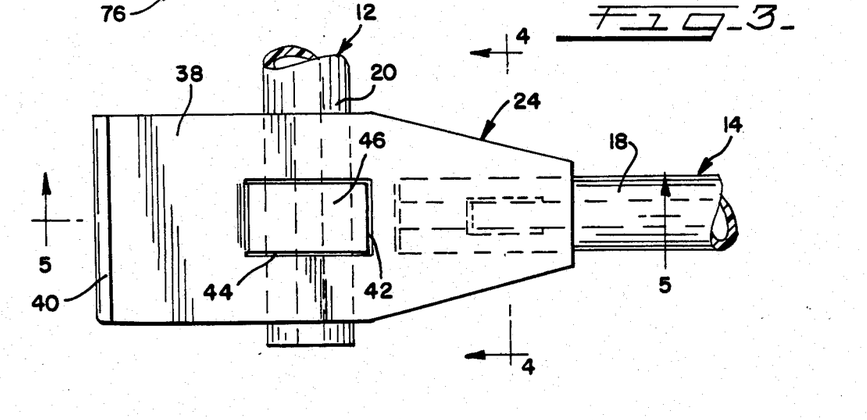
FIG. 3 is a top plan view of the leg member and the end portions of a side-tube member and a cross-tube member received therein, as shown in FIG. 2.

Referring to FIG. 1, a bed frame constructed in accordance with the present invention is indicated generally at 10. Bed frame 10 is intended to support a mattress means (not shown), such as a box spring and mattress set, in spaced relationship to a floor and includes a pair of spaced, longitudinally extending, parallel side-tube members 12 and a pair of spaced, transversely extending, parallel cross-tube members 14. The cross-tube members 14 extend between the side-tube members 12 for holding the side-tube members 12 in a spaced, parallel relationship. Members 12 and 14 are preferably formed from a suitable tubular plastic material and respectively have first end portions 16 and 18 and second end portions 20 and 22. The end portions of members 12 and 14 are received by corresponding leg members 24 for support thereof in spaced relationship above the floor.

Referring to FIGS. 2-5, leg members 24 are likewise preferably formed from a suitable plastic material so as to define a longitudinal socket portion 26 extending thereinto and a transverse socket portion 28 extending thereinto. An end portion 16 or 20 of member 12 and an end portion 18 or 22 of member 14 are respectively received in longitudinal socket portion 26 and transverse socket portion 28. In accordance with a preferred embodiment of the invention, the end portions 16 and 20 of members 12 and the end portions 18 and 22 of members 14 are respectively formed with rib portions 30 and 32 extending outwardly therefrom which are respectively received in cooperating key portions 34 and 36 respectively formed in socket portions 26 and 28. Leg members 24 are formed so as to define substantially horizontal support surfaces 38 for receipt of a mattress and/or box spring means thereon. A longitudinal flange portion 40 extends upwardly from surface 38 adjacent an outer edge thereof parallel to side-tube members 12 for retaining the mattress and/or box spring means in place above surface 38.

Leg members 24 are preferably provided with means for selectively retaining the end portions of members 12 and 14 in socket portions 26 and 28. In accordance with a preferred embodiment of the invention, an opening 42 is formed through surface 38 of leg member 24 in communication with an upper portion of socket portion 26. A living hinge member 44 is integrally formed with surface 38 having an upper surface 46 which is biased to extend a short distance above surface 38 and a lower surface 48 which extends through opening 42 into socket portion 26 to frictionally engage and retain side-tube member 12 upon an application of a downward force of a mattress and/or box spring means resting on surface 38.

Figure 4:
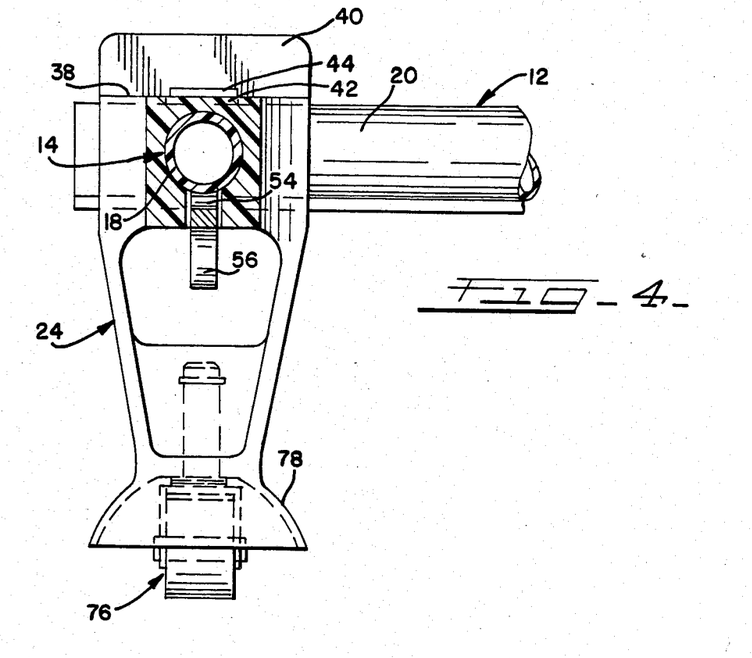
FIG. 4 is a sectional view of the invention taken along line 4—4 in FIG. 3.
Figure 5:
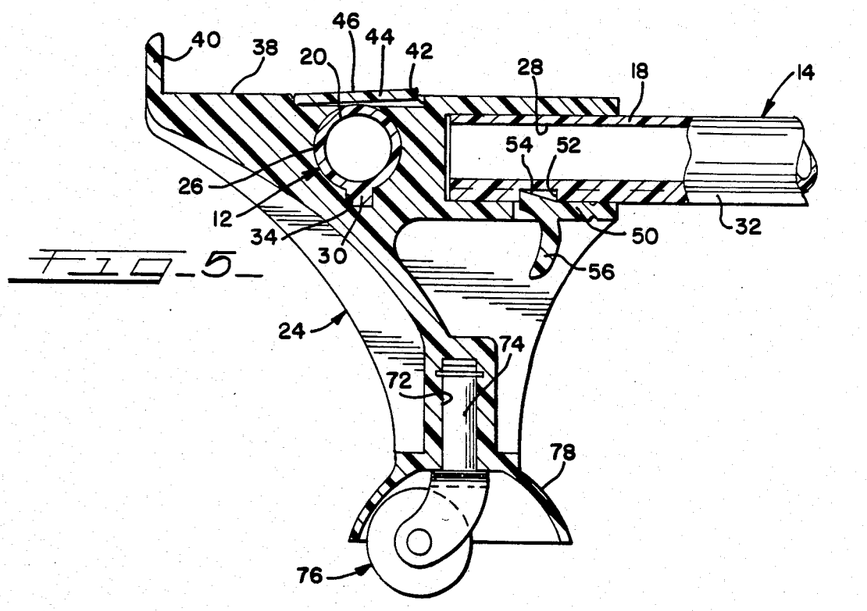
FIG. 5 is a sectional view of the invention taken along line 5—5 in FIG. 3.

Referring to FIGS. 4 and 5, in accordance with a preferred embodiment of the invention, cross-tube members 14 are retained in socket portions 28 by a latch member 50 integrally formed in leg member 24 in cooperation with a notch or notches 52 formed in rib portions 32. Latch member 50 is pivotal between a first position in locking engagement with notch 52 and a second position in disengagement with notch 52. Latch member 50 is biased towards its first position and is formed with a guide surface 54 which contacts a leading edge of the rib portion 32 upon entry of the cross-tube member 14 into socket portion 28 so as to urge the latch member towards its second position until the latch member engages notch 52 whereupon the latch member returns to its first position. Latch member 50 is formed with a finger portion 56 for selective movement thereof between its first and second positions.

The members 12 and 14 are preferably extruded from thermoplastic materials, such as polyamide resins or vinyl resins or the like, or thermosetting resins such as polyester resins or the like. The leg members 24 are preferably molded from thermoplastic materials, such as acrylonitrite-butadiene-styrene (ABS) or acetal resins or acrylic resins or polyamide resins, or polycarbonite resins or the like, or thermosetting resins such as phenolic resins or the like.

Figures 15, 16, 17:
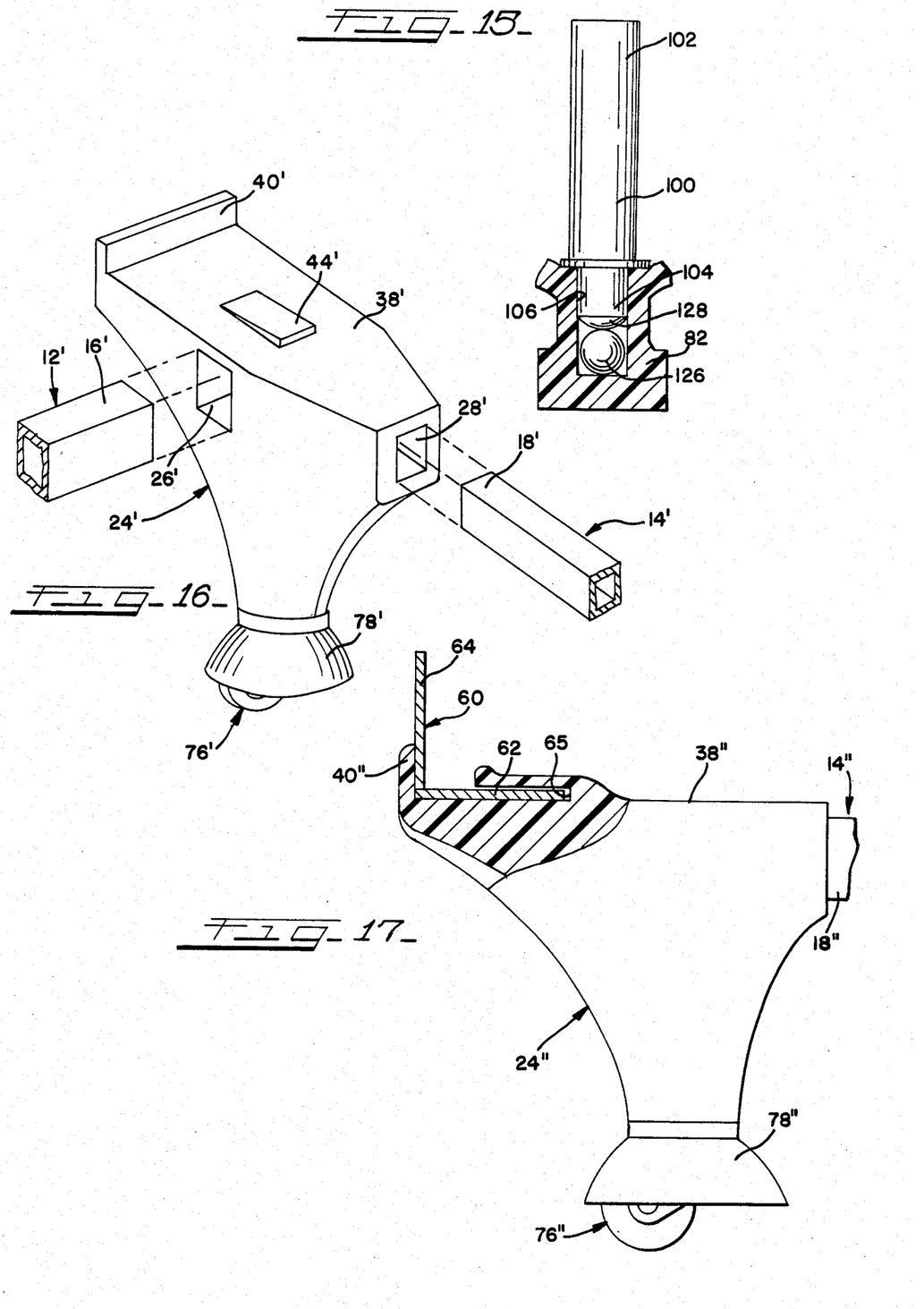
FIG. 15 is a fragmentary elevational view, partially in section, similar to FIG. 10, showing an alternative embodiment of the invention.
FIG. 16 is a perspective view, similar to FIG. 2, showing an alternative embodiment of the invention.
FIG. 17 is an elevational view, similar to FIG. 5, partially in section, showing a further alternative embodiment of the invention.

Referring to FIG. 16, an alternative embodiment of the invention is shown wherein the elements corresponding to the elements of the embodiment of FIGS. 2-5 are indicated by the same reference numeral followed by a single prime sign. The side-tube members 12' and the cross-tube members 14' are of rectangular cross section and are respectively received in sockets 26' and 28' of a similar rectangular cross section. Although not shown in FIG. 16, the lower walls of the end portions of cross-tube members 14' are provided with openings for receipt of a latch member thereinto in much the same manner as the latch member 50 engages notches 52 as discussed hereinabove. Similarly, hinge member 44' contacts the upper walls of the end portions of the side-tube members 12' in much the same manner as the hinge member 44 contacts the side-tube member 12 as discussed hereinabove.

Referring to FIG. 17, a further alternative embodiment of the invention is shown wherein the elements corresponding to the elements of the embodiment of FIGS. 2-5 are indicated by the same reference numeral followed by a double prime sign. A side-rail member 60 is substituted for the side-tube member 12 as hereinabove discussed. The side-rail member 60 is formed with a substantially horizontal leg portion 62 and a substantially vertical leg portion 64. Side-rail member 60 may be formed from a suitable metallic or plastic material. The leg portion 62 is frictionally received in a longitudinal recess 65 integrally formed in surface 38" and the leg portion 64 rests up against flange 40". The cross-tube member 14" is received by leg member 24" in much the same manner as the cross-tube member 14 is received in leg member 24 as discussed hereinabove.

Figure 6:
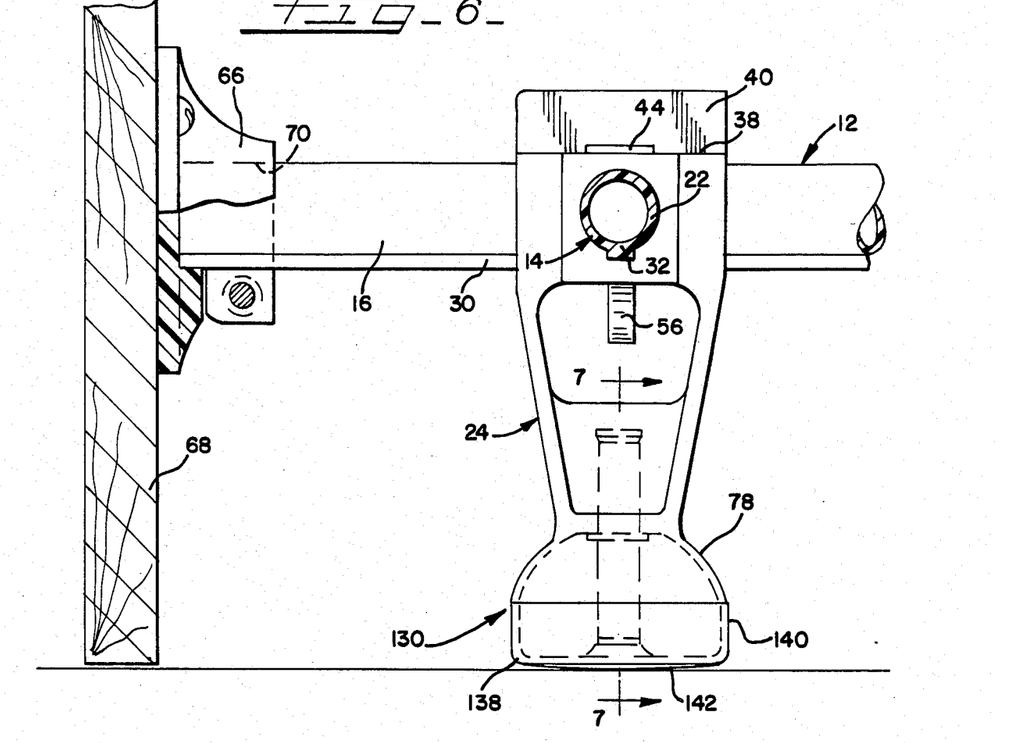
FIG. 6 is a sectional view, similar to FIG. 4, showing the invention oriented 90° and in cooperation with a glide assembly and a headboard bracket member.

Referring to FIG. 6, the end portions 16 of side-tube members 12 preferably extend through socket portions 26 of leg member 24 and may be suitably secured to a headboard bracket member 66, which in turn is suitably secured to a headboard 68. Bracket member 66 may be formed with a split socket clamp 70 for receipt of the end portion 16 thereinto. Alternatively, the end portions 16 may be adhesively secured to bracket member 66.

The lower portions of leg members 24 are preferably integrally formed with a substantially vertical socket 72 for receipt of the stem 74 of a floor engaging means 76, such as a caster wheel assembly or a glide assembly. Leg members 24 are further preferably formed with a hood portion 78 for housing the floor engaging means.

Figures 8, 9:
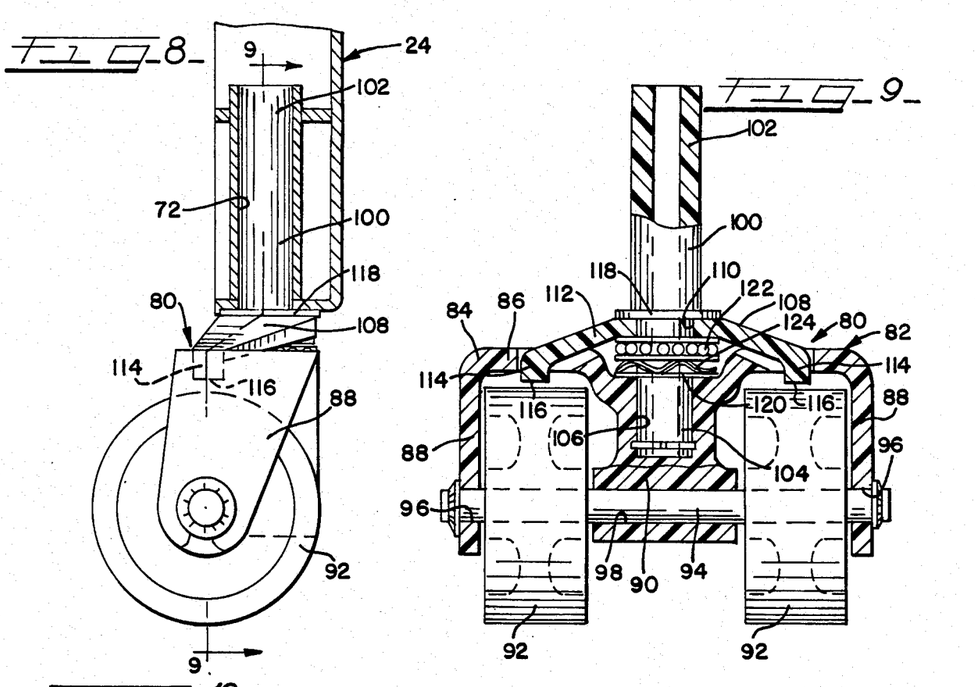
FIG. 8 is an elevational view, partially in section, of a caster wheel assembly constructed in accordance with the invention, shown in cooperation with a portion of a leg member.
FIG. 9 is an elevational view, partially in section, of the caster wheel assembly shown in FIG. 8 oriented 90°.

Referring to FIGS. 8 and 9, in accordance with the present invention, the floor engaging means 76 of bed frame 10 may include caster wheel assemblies 80 in cooperation with leg members 24. Each caster wheel assembly 80 is preferably of the type which incorporates a brake mechanism for applying a braking action to a caster wheel upon application of a predetermined downward force thereto.

Caster wheel assembly 80 comprises an integrally formed frame member 82 having a fork portion 84 defining an upper portion 86, a pair of spaced apart downwardly extending sides or legs 88 and a body portion 90 centrally disposed between legs 88. Frame member 82 is preferably formed from a suitable plastic material. A pair of caster wheels 92, sandwiched between the legs 88 and body portion 90, are journalled for rotation about a substantially horizontal axle 94. Axle 94 extends through openings 96 and 98 respectively formed through legs 88 and body portion 90. Frame member 82 is rotatably mounted about a substantially vertical shaft 100 having an upper end 102, which is received in a socket 72 of leg 24, and a lower end 104, which is suitably received in a socket 106 formed in body portion 90. Shaft 100 is preferably a tubular plastic member which is adapted to receive a steel rod (not shown) thereinto, if desired, to increase the strength thereof.

A brake yoke member 108 is rotatably received about shaft 100 through a centrally disposed opening 110 formed through a base portion 112 yoke member 108. Member 108 is formed with a pair of downwardly disposed end portions 114 which define brake surfaces 116. Member 108 is preferably formed from a suitable plastic material. Member 108 is received between an upper ring 118 slidingly secured to shaft 100 so as to permit limited vertical movement of member 108 between an upper position (FIG. 9) and a lower position, and a lower ring 120 which is positioned adjacent body portion 90. A ball bearing assembly 122 is preferably provided between base portion 112 and body portion 90 to facilitate the rotation of frame member 82 about shaft 100. A biasing means 124 is received about shaft 100 between ball bearing assembly 122 and ring 120 so as to bias member 108 towards its upper position. Biasing means 124 may take the form of a leaf-type spring, an elastomeric compression ring or the like.

As best seen in FIG. 9, brake surfaces 116 are each in facing relationship to a corresponding caster wheel 92. Caster wheel assembly 80 is shown in FIG. 9 with member 108 is in its upper position wherein brake surfaces 116 are spaced from wheels 92. Upon application of a predetermined downward force to ring 118, member 108 moves towards its lower position against the bias of means 124 whereupon brake surfaces 116 frictionally engage wheels 92 and thereby preclude the rotation thereof. Upon removal of the downward force, member 108 returns to its upper position and the wheels 92 are free to rotate about axle 94.

In accordance with the present invention, the caster wheel assemblies 80 are received in sockets 72 of leg members 24. A biasing means 124 is selected so as to maintain member 108 in its upper position upon the positioning of a mattress and/or box spring means on bed frame 10. However, the weight of a person resting on the mattress and/or box spring means exerts a sufficient additional downward force on ring 118 against the bias of biasing means 124 to move member 108 into its lower position wherein the brake surfaces 116 frictionally engage and preclude the rotation of wheels 92. Accordingly, caster wheel assemblies 80 permit the bed frame and the mattress means supported thereon to be easily moved over the floor when unoccupied and assures that the bed frame remains in a stationary position when occupied.

Figures 10, 11, 13:
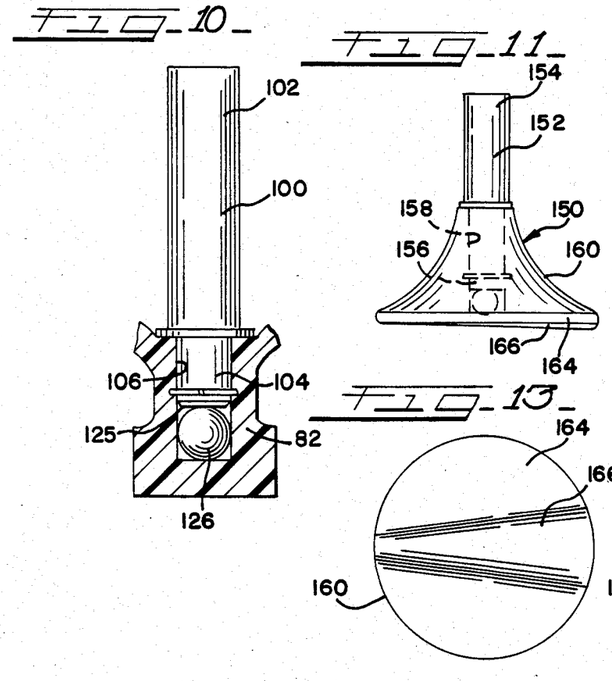
FIG. 10 is a fragmentary elevational view, partially in section, of a portion of an alternative embodiment of a caster wheel assembly constructed in accordance with the invention.
FIG. 11 is an elevational view of a glide assembly constructed in accordance with the invention.
FIG. 13 is a bottom plan view of the glide assembly as shown in FIGS. 11 and 12.

Referring to FIGS. 10 and 15, two alternative arrangements are shown for rotatably securing shaft 100 to frame member 82 of caster assembly 80 in accordance with the invention. Referring to FIG. 10, the lower end 104 of shaft 100 has a substantially flat surface 125 received in socket 106 which contacts a single ball bearing 126 rotatably received in the bottom of socket 106. Referring to FIG. 15, the lower end 104 of shaft 100 has a convex surface 128 received in socket 106 which contacts a single ball bearing 126. These embodiments provide a low swivel point to caster assembly 80.

Figure 7:
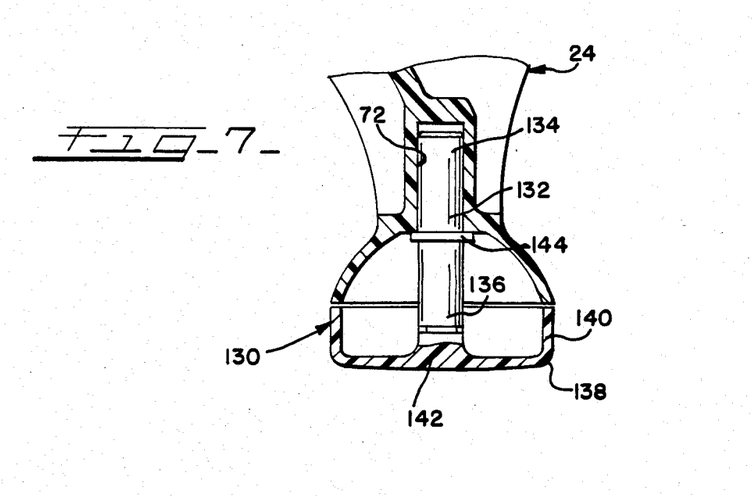
FIG. 7 is a sectional view of a glide assembly constructed in accordance with the invention, shown in cooperation with a portion of a leg member.

Referring to FIGS. 6 and 7, in accordance with the present invention, the floor engaging means 76 of bed frame 10 may include glide assemblies 130 in cooperation with leg members 24. A first embodiment of glide assembly 130 includes a substantially vertical stem 132 having an upper end 134, which extends into and is received in socket 72 of leg member 24, and a lower end 136, which extends through and below hood 78. A glide member 138 is rigidly secured to the lower end 136 of stem 132. Glide member 138 is defined by a upstanding peripheral side wall surface 140 and a floor engaging bottom surface 142. For decorative purposes and to prevent dirt from entering glide 138, side wall surface 140 is preferably dimensioned to be substantially coextensive with hood 78. Stem 132 is provided with an outwardly extending ring 144 which contacts the lower edge of socket 72 and thereby retains glide 138 a short distance below hood 78. Stem 132 and glide 138 are preferably integrally molded from a suitable plastic material.

Figure 12:
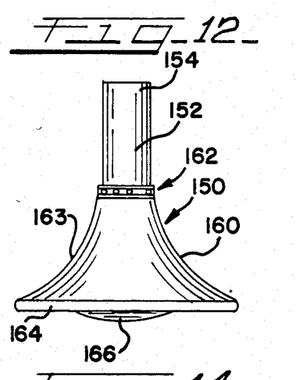
FIG. 12 is an elevational view of a glide assembly constructed in accordance with an alternative embodiment of the invention.
Figure 14:
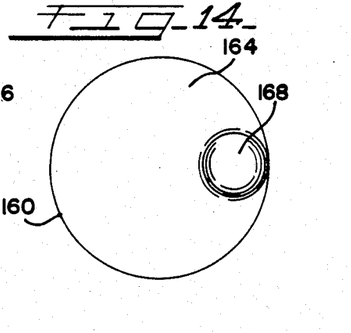
FIG. 14 is a bottom plan view of an alternative embodiment of a glide assembly.

Referring to FIGS. 11-13, an alternative glide assembly 150 is shown constructed in accordance with the invention. Glide assembly 150 includes a stem member 152 having an upper end 154 for receipt within socket 72 (not shown) and a lower end 156 which is rotatably received in a socket 158 integrally formed in a glide member 160. Stem 154 may be rotatably received in socket 158 in much the same manner as stem 100 is rotatably received in socket 106 (see FIG. 10), as shown in FIG. 11. Alternatively, stem 154 may be rotatably received in a socket integrally formed in glide member 160 through a ball bearing assembly 162 in a conventional manner, as shown in FIG. 12. Glide member 160 is preferably integrally formed of a suitable plastic material so as to define an upwardly converging side wall surface 163 and a substantially planar bottom surface 164. In order to facilitate initial sliding movement of glide assembly 150 over a carpeted floor, the bottom surface 164 of glide member 160 is preferably formed with an outwardly extending protrusion 166 which converges outwardly and extends downwardly as it extends across the bottom surface. Alternatively, as depicted in FIG. 14, the bottom surface 164 of glide member 160 may be formed with an outwardly extending eccentrically positioned button 168. In both instances, initial movement of the glide assembly 150 causes the glide member to rotate about shaft 152 which facilitates the initial movement of the bed frame 10 across a carpeted floor.

What is claimed is:

1. A bed frame for supporting a mattress means in spaced relationship to a floor, comprising a pair of longitudinally extending spaced, parallel side-tube members formed of a plastic material having first and second end portions associated therewith; a pair of transversely extending, spaced parallel cross-tube members formed of a plastic material having first and second end portions associated therewith; a plurality of leg members formed of a plastic material for receiving and supporting said side-tube members and said cross-tube members above a floor, each of said leg members having a longitudinal socket integrally formed therein for receiving one of said first or second end portions of said side-tube members, each of said leg members having a transverse socket integrally formed therein for receiving one of said first or second end portions of said cross-tube members; each of said leg members being formed with a substantially planar horizontal support surface for receipt of a mattress means thereon; said longitudinal and transverse sockets being spaced below said horizontal surface and retaining said side-tube members and cross-tube members below said horizontal surface; retaining means on said support surface of each leg member in alignment with the longitudinal sockets thereon, said retaining means cooperating with a mattress means supported on the support surface of said leg members to grip said side tube members; and floor engaging means associated with each of said leg members for supporting the bed frame above the floor, said floor engaging means being spaced from and not connected to one another at the level of the floor.

2. The invention as defined in claim 1 wherein each of said leg members having a longitudinal flange portion extending upwardly from an outer edge of said horizontal surface for retaining a mattress means in place above said horizontal surface.

3. The invention as defined in claim 1, wherein each of said retaining means includes an opening formed in said horizontal surface in communication with an upper portion of said longitudinal socket, and a living hinge member formed integrally with said horizontal surface which extends into said opening in contact with said side-tube member such that upon application of a downward force of a mattress means on said hinge member causes said hinge member to frictionally engage and retain said side-tube member within said longitudinal socket.

4. The invention as defined in claim 1 wherein said first and second end portions of said side-tube members having a rib portion projecting outwardly therefrom which are received in cooperating key portions formed in said longitudinal sockets.

5. The invention as defined in claim 4 wherein said first end portions of said side-tube members extend through said longitudinal sockets and are secured to a headboard bracket member.

6. The invention as defined in claim 5 wherein said headboard bracket member having a socket portion formed therein for receipt of said first end portion of said side-tube member thereinto, and said socket portion having a key portion formed integrally therewith for receipt of said rib portion of said side-tube member.

7. The invention as defined in claim 5 wherein said headboard bracket member has a socket formed therein for receipt of said first end portion of said side-tube member thereinto.

8. The invention as defined in claim 7 wherein said first end portion of said side-tube member is glued to said headboard bracket member.

9. The invention as defined in claim 7 wherein said headboard bracket member is provided with clamp means for selectively securing said first end portion of said side-tube member to said headboard bracket member.

10. The invention as defined in claim 1 wherein said leg members have a cross-tube retaining means for retaining said cross-tube member within said transverse socket.

11. The invention as defined in claim 10 wherein said first and second end portions of said cross-tube members having a longitudinally extending rib portion projecting outwardly therefrom which is received in a cooperating key portion formed in said transverse socket.

12. The invention as defined in claim 11 wherein said rib portion having a notch formed therein which extends into said transverse socket as said cross-tube member is positioned within said transverse socket and said cross-tube retaining means comprising a latch member pivotal with respect to said transverse socket between a first position in locking engagement with said notch and a second position in disengagement with said notch.

13. The invention as defined in claim 12 wherein said latch member being biased towards its first position, said latch member having a guide surface which contacts a leading edge of said rib portion upon entry of said cross-tube member into said transverse socket so as to urge said latch member towards its second position, and said latch member returning to its first position as said latch member engages said notch.

14. The invention as defined in claim 13 wherein said latch member having a finger portion formed integrally therewith for selective movement of said latch member between its first and second positions.

15. The invention as defined in claim 14 wherein said latch member is formed integrally with said leg member.

16. The invention as defined in claim 1 wherein each of said leg members having a substantially vertical socket formed integrally therewith for receipt of said floor engaging means.

17. The invention as defined in claim 16 wherein said floor engaging means being a caster wheel assembly.

18. The invention as defined in claim 17 wherein said floor engaging means being a glide assembly.

19. The invention as defined in claim 1 wherein said first and second end portions of said cross-tube members have a rib portion projecting outwardly therefrom which is received in a cooperating key portion formed in said transverse socket.

20. The invention as defined in claim 1 wherein said first and second end portions of said side-tube members have a rectangular cross-section and said longitudinal sockets have a cooperating rectangular cross-section.

21. The invention as defined in claim 10 wherein said first and second end portions of said cross-tube members have an opening formed therein and said cross-tube retaining means comprises a latch member selectively pivotal with respect to said transverse socket member between a first position in locking engagement with said opening and a second position in disengagement with said opening.

22. The invention as defined in claim 21 wherein said latch member being biased towards its first position, said latch member having a guide surface which contacts a leading end of said cross-tube member upon entry of said cross-tube member into said transverse socket so as to urge said latch member towards its second position, and said latch member returning to its first position as said latch member engages said opening.

23. The invention as defined in claim 22 wherein said latch member having a finger portion formed integrally therewith for selective movement of said latch member between its first and second positions.

24. The invention as defined in claim 23 wherein said latch member is formed integrally with said leg member.

25. A bed frame for supporting a mattress means in spaced relationship to a floor, comprising: a pair of longitudinally extending spaced, parallel side-rail members having first and second end portions associated therewith; a pair of tranversely extending, spaced, parallel cross-tube membrs formed of a plastic material having first and second end portions associated therewith; a plurality of leg members formed of a plastic material for receiving and supporting said side-rail members and said cross-tube members above a floor, each of said leg members having a longitudinal recess integrally formed therein for receiving one of said first or second end portions of said side-rail members, each of said leg members having a traverse socket integrally formed therein for receiving one of said first or second end portions of said cross-tube members; each of said leg members being formed with a substantially planar horizontal support surface for receipt of a mattress means thereon; and retaining means associated with each of said leg members above the support surface thereon in alignmanet with the recess therein; whereby a mattress means supported on the horizontal support surfaces of said leg members cooperates with said retaining means to grip said side rail members; and floor engaging means for supporting said leg members above the floor.

26. The invention as defined in claim 25 wherein each of said leg members having a cross-tube retaining means for retaining said cross-tube member within said transverse socket.

27. The invention as defined in claim 25 wherein said side-rail members have a substantially vertical leg portion and a substantially horizontal leg portion.

28. For use in cooperation with a bed frame for supporting a mattress means in spaced relationship to a floor, said bed frame having spaced parallel side-tube members and spaced parallel cross-tube members; a leg member integrally molded of a plastic material, comprising: a longitudinal socket integrally formed therein for receiving an end portion of one of said side-tube members; a transverse socket formed therein for receiving an end portion of one of said cross-tube members; a substantially planar horizontal support surface for recipt of a mattress means thereon, said support surface being spaced vertically above said longitudinal and tranverse sockets; a socket formed therein and extending downwardly with respect to said support surface for receipt of a floor engaging means; and side-tube retaining means on said support surface in alignment with said longitudinal socket, said side-tube retaining means being positioned to cooperate with said mattress means supported on said support surface to grip a side-tube member within said longitudinal socket.

29. The invention as defined in claim 28 wherein said leg member is formed with a longitudinal flange portion extending upwardly from an outer edge of said horizontal surface for retaining a mattress means in place above said horizontal surface.

30. The invention as defined in claim 28 wherein said side-tube retaining means includes a living hinge member formed integrally with said horizontal surface that extends into an opening formed in said horizontal surface in communication with said longitudinal socket so as to contact and frictionally engage a side-tube member positioned within said longitudinal socket upon application of a downward force of a mattress means on said hinge member.

31. The invention as defined in claim 28 wherein said leg member is formed with cross-tube retaining means for retaining a cross-tube member within said transverse socket.

32. The invention as defined in claim 31 wherein said cross-tube retaining means includes a latch member pivotal with respect to said transverse socket between a first position extending into said transverse socket for engaging a cross-tube member positioned in said transverse socket and a second position exterior of said transverse socket in disengagement with a cross-tube member positioned in said transverse socket.

* * * * *